United States Patent
Inaguma et al.

(10) Patent No.: US 8,878,661 B2
(45) Date of Patent: Nov. 4, 2014

(54) INFORMATION COMMUNICATION SYSTEM AND VEHICLE PORTABLE DEVICE

(71) Applicants: Takahiro Inaguma, Aichi (JP); Koji Takizawa, Aichi (JP); Tetsuo Nishidai, Aichi (JP)

(72) Inventors: Takahiro Inaguma, Aichi (JP); Koji Takizawa, Aichi (JP); Tetsuo Nishidai, Aichi (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 87 days.

(21) Appl. No.: 13/682,972

(22) Filed: Nov. 21, 2012

(65) Prior Publication Data

US 2013/0162421 A1   Jun. 27, 2013

(30) Foreign Application Priority Data

Nov. 24, 2011   (JP) ................. 2011-256210

(51) Int. Cl.
*B60Q 1/00*   (2006.01)
*H04B 5/00*   (2006.01)
*H04M 1/60*   (2006.01)

(52) U.S. Cl.
CPC ............... *H04B 5/0031* (2013.01); *B60Q 1/00* (2013.01); *H04M 1/6075* (2013.01)
USPC ..................................................... 340/438

(58) Field of Classification Search
CPC .. G08G 1/09626; G08G 1/205; H04W 88/04; B60R 25/01; B60R 25/102; B60R 25/10; H04B 1/00
USPC ............... 340/438, 901, 933, 988, 426.13, 340/426.17, 426.28, 13.24, 10.1; 455/418, 455/426.1; 701/45, 51
See application file for complete search history.

(56) References Cited

U.S. PATENT DOCUMENTS

| | | | |
|---|---|---|---|
| 6,167,338 A | | 12/2000 | De Wille et al. |
| 6,917,801 B2 * | | 7/2005 | Witte et al. ................... 455/418 |
| 6,970,703 B2 * | | 11/2005 | Fuchs et al. ................ 455/426.1 |
| 7,504,931 B2 * | | 3/2009 | Nguyen ................... 340/426.36 |
| 7,821,383 B2 * | | 10/2010 | Sultan et al. ............. 340/426.13 |

(Continued)

FOREIGN PATENT DOCUMENTS

| | | |
|---|---|---|
| DE | 19740525 C1 | 2/1999 |
| DE | 102006041765 A1 | 3/2008 |

(Continued)

OTHER PUBLICATIONS

Office Action issued in corresponding German Application No. 10 2012 111 349.1, mailed Oct. 7, 2013 (17 pages).

(Continued)

*Primary Examiner* — Phung Nguyen
(74) *Attorney, Agent, or Firm* — Osha Liang LLP

(57) ABSTRACT

An information communication system has a vehicle portable device that conducts wireless communication with a vehicle, and a mobile terminal that includes a display part and conducts near-field wireless communication with the vehicle portable device. The vehicle portable device includes a vehicle information acquisition part that acquires vehicle information on the vehicle, wherein the vehicle information is transmitted from the vehicle by wireless communication, and a transmission controller that controls the transmission of the vehicle information to the mobile terminal by near-field wireless communication. The mobile terminal includes an execution controller that acquires the vehicle information transmitted from the vehicle portable device and controls execution of a predetermined program for displaying the vehicle information on the display part.

14 Claims, 9 Drawing Sheets

(56) References Cited

U.S. PATENT DOCUMENTS

| | | |
|---|---|---|
| 8,232,864 B2 | 7/2012 | Kakiwaki |
| 2005/0137796 A1 | 6/2005 | Gumpinger |
| 2006/0061458 A1 | 3/2006 | Simon et al. |
| 2006/0114100 A1* | 6/2006 | Ghabra et al. ............... 340/5.61 |
| 2007/0135978 A1* | 6/2007 | Kim et al. ...................... 701/29 |
| 2008/0246586 A1 | 10/2008 | Hiramine |
| 2010/0141412 A1* | 6/2010 | Partin et al. ............. 340/426.18 |
| 2011/0128007 A1 | 6/2011 | Nishidai et al. |
| 2011/0187513 A1* | 8/2011 | Taki et al. .................. 340/13.25 |

FOREIGN PATENT DOCUMENTS

| | | | |
|---|---|---|---|
| DE | 102009017048 A1 | 10/2010 | |
| DE | 102009035654 A1 | 2/2011 | |
| DE | 102010012565 A1 | 9/2011 | |
| EP | 2048629 A2 | 4/2009 | |
| JP | 2007-046395 A | 2/2007 | |
| JP | 2008-255702 A | 10/2008 | |
| JP | 2009-257027 A | 11/2009 | |
| JP | 2010126966 A | 6/2010 | |
| JP | 2011112617 A | 6/2011 | |
| WO | 03098557 A2 | 11/2003 | |
| WO | 2006-090460 A1 | 8/2006 | |
| WO | 2007/114177 A1 | 10/2007 | |

OTHER PUBLICATIONS

Espacenet Patent Abstract for German Publication No. 10 2009 035 654, dated Feb. 3, 2011 (2 pages).
Espacenet Patent Abstract for German Publication No. 10 2009 017 048, dated Oct. 14, 2010 (2 pages).
Espacenet Patent Abstract for German Publication No. 10 2006 041 765, dated Mar. 20, 2008 (2 pages).
Espacenet Patent Abstract for German Publication No. 10 2010 012 565, dated Sep. 29, 2011 (2 pages).
English Patent Abstract of WO2006090460 from esp@cenet, Publication Date: Aug. 31, 2006 (1 Page).
Patent Abstracts of Japan, Publication No. 2007-046395, Dated Feb. 22, 2007 (1 Page).
Patent Abstracts of Japan, Publication No. 2010-126966, Dated Jun. 10, 2010 (1 Page).
Office Action issued in counterpart Japanese Patent Application No. 2011-256210 dated Jan. 17, 2014 (9 pages).

* cited by examiner

*FIG. 11*

```
BATTERY CHARGE AMOUNT: 50%
(ACQUIRED DATE AND TIME:
BEFORE 10 MINUTES)

DOOR LOCK: FULLY CLOSED

HEAD LIGHT: TURNED OFF
ROOM LIGHT: TURNED OFF
HAZARD LAMP: TURNED OFF

REAR LEFT SEAT WINDOW:
HALFWAY OPEN

RUNNING DISTANCE: *** km
```

*FIG. 12*

```
BATTERY CHARGE AMOUNT: 50%
(ACQUIRED DATE AND TIME:
17:30 JANUARY 1ST)

DOOR LOCK: FULLY CLOSED

HEAD LIGHT: TURNED OFF
ROOM LIGHT: TURNED OFF
HAZARD LAMP: TURNED OFF

REAR LEFT SEAT WINDOW:
HALFWAY OPEN

RUNNING DISTANCE: *** km
```

INFORMATION COMMUNICATION SYSTEM AND VEHICLE PORTABLE DEVICE

BACKGROUND

1. Technical Field

The present invention relates to an information communication system and a vehicle portable device, particularly to an information communication system and a vehicle portable device, for notifying a user of information on a vehicle.

2. Related Art

In a conventional studies, a display screen is provided in a vehicle portable device for locking and unlocking a door of a vehicle, vehicle information on a state of the vehicle and the like is acquired from the vehicle by wireless communication, and the vehicle information is allowed to be displayed on the display screen. For example, Japanese Unexamined Patent Publication No. 2010-126966 proposes that a vehicle key, for locking and unlocking the door of the vehicle in non-contact manner, acquires energy remaining information (a gasoline remaining amount or a battery remaining amount) on vehicle driving energy with a lock operation as a trigger, and displays the energy remaining information on a display part of the vehicle key.

However, power consumption increases in order to drive the display screen when the vehicle information is displayed on the vehicle portable device. In the proposal disclosed in Japanese Unexamined Patent Publication No. 2010-126966, only the energy remaining information is displayed. When many more pieces of vehicle information are displayed, it is necessary to enlarge the display screen, which further increases the power consumption.

On the other hand, generally a single-use battery such as a button battery that is not rechargeable is used in the vehicle portable device. Therefore, with increasing power consumption, it is necessary to frequently change the battery.

U.S. Pat. No. 7,821,383, for example, proposes that the vehicle portable device (a portable FOB) conducts middle-range wireless communication with an in-car communication device, conducts short-range wireless communication with a portable communication terminal, and relays transmission of a menu from the in-car communication device to the portable communication terminal and transmission of a menu selection result from the portable communication terminal to the in-car communication device, thereby operating the vehicle from the portable communication terminal.

Japanese Unexamined Patent Publication No. 2007-46395, for example, proposes that a base unit incorporated in the vehicle and the vehicle portable device (an extension handset) conduct the wireless communication with each other to control a vehicle key, the portable communication terminal is connected to the extension handset in a wired manner, information on a setting change is transmitted to the base unit through the extension handset when a user operates a setting change screen displayed on the portable communication terminal, thereby changing the setting of in-car devices.

International Patent Publication No. 2006/090460, for example, proposes that, when the portable communication terminal reads an individual recognition code from a wireless IC tag, application software associated with the individual recognition code is automatically started up in the portable communication terminal.

Japanese Unexamined Patent Publication No. 2011-112617, for example, proposes that charge characteristic data of the battery is transmitted from an in-car device to a portable device when the battery of the vehicle is charged. In the portable device, in the case where the charge information cannot be received from the in-car device when a charge inquiry button of the portable device is pressed, a battery predicted remaining amount and a predicted time until the charge is completed are calculated using the previously acquired charge characteristic data, and the battery predicted remaining amount and the predicted time are displayed on the display part.

SUMMARY

One or more embodiments of the present invention checks the vehicle information by the simple operation while the power consumption of the vehicle portable device is suppressed.

According to one or more embodiments of the present invention, an information communication system includes: a vehicle portable device that conducts wireless communication with a vehicle; and a mobile terminal that includes a display part and conducts near-field wireless communication with the vehicle portable device, wherein the vehicle portable device includes: a vehicle information acquisition part that acquires vehicle information on the vehicle, the vehicle information being transmitted from the vehicle by wireless communication; and a transmission controller that controls the transmission of the vehicle information to the mobile terminal by near-field wireless communication, the mobile terminal includes an execution controller that acquires the vehicle information transmitted from the vehicle portable device and controls execution of a predetermined program for displaying the vehicle information on the display part, when the near-field wireless communication is established between vehicle portable device and the mobile terminal, the vehicle information acquisition part acquires the vehicle information from the vehicle, the transmission controller transmits the vehicle information acquired from the vehicle to the mobile terminal, and the execution controller starts up the program, acquires the vehicle information transmitted from the vehicle portable device, and displays the vehicle information on the display part.

In a information communication system in accordance with one or more embodiments of the present invention, when the near-field wireless communication is established between the vehicle portable device and the mobile terminal, the vehicle portable device acquires the vehicle information from the vehicle, transmits the vehicle information acquired from the vehicle to the mobile terminal, and the mobile terminal starts up the predetermined program, acquires the vehicle information transmitted from the vehicle portable device, and displays the vehicle information on the display part.

Accordingly, the vehicle information can be checked by the simple operation to bring the vehicle portable device and the mobile terminal close to each other. The vehicle information is not displayed on the vehicle portable device, so that the power consumption of the vehicle portable device can be suppressed.

According to one or more embodiments of the present invention, the vehicle portable device is constructed by a key fob for the vehicle. According to one or more embodiments of the present invention, the mobile terminal is constructed by a mobile phone, a smartphone, a Personal Digital Assistance (PDA), a portable music player, or a portable game machine. According to one or more embodiments of the present invention, the vehicle information acquisition part, the transmission controller, and the execution controller are constructed by arithmetic processing units, such as a CPU.

In an information communication system according to one or more embodiments of the present invention, the vehicle portable device is used to lock and unlock a door of the vehicle by wireless communication and further includes a storage in which the vehicle information is stored, when the door of the vehicle is locked, the vehicle information acquisition part acquires the vehicle information from the vehicle and stores the acquired vehicle information in the storage, when the vehicle and the vehicle portable device can conduct the wireless communication with each other while the near-field wireless communication is established between the vehicle portable device and the mobile terminal, the vehicle information acquisition part acquires the vehicle information from the vehicle and updates the vehicle information stored in the storage, the transmission controller transmits the vehicle information acquired from the vehicle to the mobile terminal, and, when the vehicle and the vehicle portable device cannot conduct the wireless communication with each other while the near-field wireless communication is established between the vehicle portable device and the mobile terminal, the transmission controller transmits the vehicle information stored in the storage to the mobile terminal.

Therefore, the latest vehicle information can be checked when the vehicle and the vehicle portable device can conduct the wireless communication with each other, and the vehicle information can also be checked when the vehicle and the vehicle portable device cannot conduct the wireless communication.

In an information communication system according to one or more embodiments of the present invention, the vehicle information acquisition part stores acquired time information indicating a time the vehicle information is acquired in the storage together with vehicle information, and the transmission controller transmits the acquired time information to the mobile terminal together with the vehicle information.

Therefore, the time the vehicle information is acquired (updated) can be checked.

In an information communication system according to one or more embodiments of the present invention, when the vehicle and the vehicle portable device can conduct the wireless communication with each other while the near-field wireless communication is established between the vehicle portable device and the mobile terminal, the vehicle information acquisition part determines whether the vehicle information stored in the storage requires an update, acquires the vehicle information that requires the update from the vehicle, and updates the vehicle information stored in the storage, and the transmission controller transmits the vehicle information acquired from the vehicle by the vehicle information acquisition part to the mobile terminal with respect to the vehicle information that requires the update, and transmits the vehicle information stored in the storage to the mobile terminal with respect to the vehicle information that does not require the update.

Therefore, the user can always check the latest vehicle information, the communication amount between the vehicle and the vehicle portable device can be reduced to suppress the power consumption of the vehicle portable device, and the response time until the vehicle information is displayed on the mobile terminal can be shortened.

In an information communication system according to one or more embodiments of the present invention, the vehicle information acquisition part stops the acquisition of the vehicle information from the vehicle for a predetermined time period since the door of the vehicle is locked, and, when the near-field wireless communication is established between the vehicle portable device and the mobile terminal within the predetermined time period since the door of the vehicle is locked, the transmission controller transmits the vehicle information stored in the storage to the mobile terminal regardless whether the vehicle and the vehicle portable device can conduct the wireless communication with each other.

Therefore, the communication amount between the vehicle and the vehicle portable device can be reduced to suppress the power consumption of the vehicle portable device, and the response time until the vehicle information is displayed on the mobile terminal can be shortened.

In accordance with one or more embodiments of the present invention, a vehicle portable device includes: a wireless communication part that conducts wireless communication with a vehicle; a near-field wireless communication part that conducts near-field wireless communication with a mobile terminal, the mobile terminal including a display part that displays vehicle information on the vehicle; a vehicle information acquisition part that acquires the vehicle information transmitted from the vehicle by wireless communication; and a transmission controller that controls the vehicle information transmitted to the mobile terminal by near-field wireless communication, wherein, when the near-field wireless communication with the vehicle portable device is established, the vehicle information acquisition part acquires the vehicle information from the vehicle, and the transmission controller transmits the vehicle information acquired from the vehicle to the mobile terminal.

In a vehicle portable device in accordance with one or more embodiments of the present invention, when the near-field wireless communication with the mobile terminal is established, the vehicle information is acquired from the vehicle, and the vehicle information acquired from the vehicle is transmitted to the mobile terminal.

Accordingly, the vehicle information can be checked by the simple operation to bring the vehicle portable device and the mobile terminal close to each other. The vehicle information is not displayed on the vehicle portable device, so that the power consumption of the vehicle portable device can be suppressed.

According to one or more embodiments of the present invention, the vehicle portable device is constructed by the key fob for the vehicle. According to one or more embodiments of the present invention, the mobile terminal is constructed by the mobile phone, the smartphone, the Personal Digital Assistance (PDA), the portable music player, or the portable game machine. According to one or more embodiments of the present invention, the wireless communication part includes an antenna and a communication device (including a communication chip). According to one or more embodiments of the present invention, the near-field wireless communication part includes an antenna and a communication device (including a communication chip). According to one or more embodiments of the present invention, the vehicle information acquisition part and the transmission controller are constructed by arithmetic processing units, such as a CPU.

According to one or more embodiments of the present invention, the vehicle portable device is used to lock and unlock a door of the vehicle by wireless communication, and further includes a storage in which the vehicle information is stored, vehicle portable device when the door of the vehicle is locked, the vehicle information acquisition part acquires the vehicle information from the vehicle and stores the acquired vehicle information in the storage, when the wireless communication with the vehicle can be conducted while the near-field wireless communication with the mobile terminal is established, the vehicle information acquisition part acquires the vehicle information from the vehicle and updates the vehicle information stored in the storage, the transmission controller transmits the vehicle information acquired from the vehicle to the mobile terminal, and, when the wireless communication with the vehicle cannot be conducted while the near-field wireless communication with the mobile terminal is established, the transmission controller transmits the vehicle information stored in the storage to the mobile terminal.

Therefore, the latest vehicle information can be checked when the vehicle and the vehicle portable device can conduct the wireless communication with each other, and the vehicle information can also checked when the vehicle and the vehicle portable device cannot conduct the wireless communication.

In an information communication system according to one or more embodiments of the present invention, the vehicle information acquisition part stores acquired time information indicating a time the vehicle information is acquired in the storage together with vehicle information, and the transmission controller transmits the acquired time information to the mobile terminal together with the vehicle information.

Therefore, the time the vehicle information is acquired (updated) can be checked.

In a vehicle portable device according to one or more embodiments of the present invention, when the vehicle and the vehicle portable device can conduct the wireless communication with each other while the near-field wireless communication with the vehicle portable device is established, the vehicle information acquisition part determines whether the vehicle information stored in the storage requires an update, acquires the vehicle information that requires the update from the vehicle, and updates the vehicle information stored in the storage, and the transmission controller transmits the vehicle information acquired from the vehicle by the vehicle information acquisition part to the mobile terminal with respect to the vehicle information that requires the update, and transmits the vehicle information stored in the storage to the mobile terminal with respect to the vehicle information that does not require the update.

Therefore, the user can always check the latest vehicle information, the communication amount between the vehicle and the vehicle portable device can be reduced to suppress the power consumption of the vehicle portable device, and the response time until the vehicle information is displayed on the mobile terminal can be shortened.

In a vehicle portable device according to one or more embodiments of the present invention, the vehicle information acquisition part stops the acquisition of the vehicle information from the vehicle for a predetermined time period since the door of the vehicle is locked, and, when the near-field wireless communication with the vehicle portable device is established within the predetermined time period since the door of the vehicle is locked, the transmission controller transmits the vehicle information stored in the storage to the mobile terminal regardless whether the wireless communication with the vehicle can be conducted.

Therefore, the communication amount between the vehicle and the vehicle portable device can be reduced to suppress the power consumption of the vehicle portable device, and the response time until the vehicle information is displayed on the mobile terminal can be shortened.

In accordance with one or more embodiments of the present invention, the vehicle information can be checked by the simple operation while the power consumption of the vehicle portable device is suppressed.

BRIEF DESCRIPTION OF THE DRAWINGS

FIG. 11 is a view illustrating a second display example of the vehicle information in the display operation part of the mobile terminal; and FIG. 12 is a view illustrating a third display example of the vehicle information in the display operation part of the mobile terminal.

DETAILED DESCRIPTION

Figure 1:
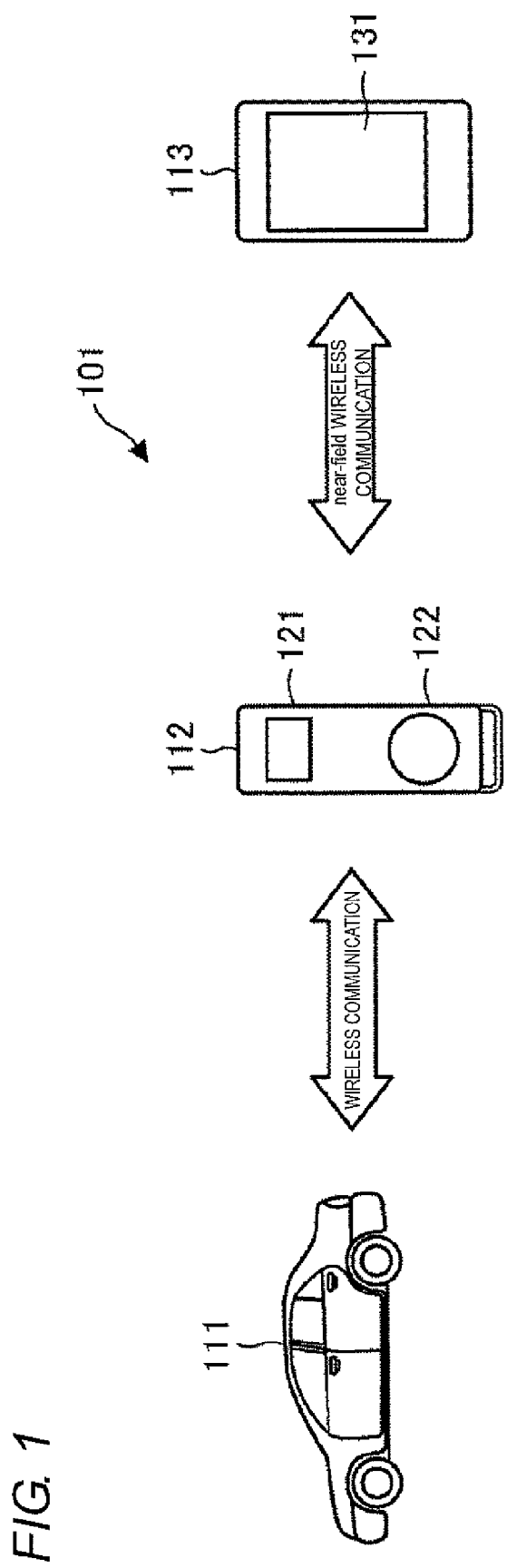
FIG. 1 is a conceptual view illustrating an information communication system according to one or more embodiments of the present invention.

Embodiments of present invention will be described below. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The description is made as follows.
1. Embodiment
2. Modification 1. Embodiments 1-1. Configuration Example of Information Communication System FIG. 1 is a conceptual view illustrating an information communication system 101 for vehicles according to one or more embodiments of the present invention.

The information communication system 101 includes a vehicle 111, vehicle portable device 112, and a mobile terminal 113.

According to one or more embodiments of the present invention, the vehicle 111 and the vehicle portable device 112 conduct wireless communication by radio wave having an LF (Low Frequency) band or a UHF (Ultra High Frequency) band to transmit and receive various commands and pieces of information to and from each other. According to one or more embodiments of the present invention, an excellent-security, own communication system is adopted as a communication system between the vehicle 111 and the vehicle portable device 112.

According to one or more embodiments of the present invention, the wireless communication is conducted using the LF band in the case where the vehicle portable device 112 transmits a predetermined command signal (for example, entry-system command signals, such as lock and unlock of a door of the vehicle 111) to the vehicle 111, and the wireless communication is conducted using the UHF band in other cases.

The vehicle portable device 112 and the mobile terminal 113 conduct near-field wireless communication having maximum communication ranges of tens of centimeters to transmit and receive various commands and pieces of information to and from each other. A communication system based on general communication standards, such as NFC (Near Field Communication), is adopted as a communication system between the vehicle portable device 112 and the mobile terminal 113.

According to one or more embodiments of the present invention, the vehicle portable device 112 is used as a key fob for the vehicle 111, and has an entry key function in what is called a smart entry system or a keyless entry system. According to one or more embodiments of the present invention, authentication processing is performed by wireless communication between the vehicle 111 and the vehicle portable device 112 by a trigger such that a switch (not illustrated) of the vehicle portable device 112 is operated, such that a switch (not illustrated) near the door of the vehicle 111 is operated, or such that the vehicle 111 and the vehicle portable device 112 can conduct communication, and the door of the vehicle 111 is locked or unlocked when the authentication processing is successfully performed.

The vehicle portable device 112 has a function of relaying the communication between the vehicle 111 and the mobile terminal 113. That is, the vehicle portable device 112 can receive a command and information, which are transmitted from the vehicle 111, and transfer the command and the information to the mobile terminal 113, or the vehicle portable device 112 can receive a command and information, which are transmitted from the mobile terminal 113, and transfer the command and the information to the vehicle 111.

The vehicle portable device 112 includes a display part 121 and a button 122. When the button 122 is operated, part of vehicle information on the vehicle 111, which is acquired from the vehicle 111 is displayed on the display part 121.

The mobile terminal 113 is not limited to a specific kind of the mobile device as long as the mobile terminal 113 can conduct the near-field wireless communication with the vehicle portable device 112, execute a predetermined application program (hereinafter referred to as a vehicle information display program) for acquiring and displaying the vehicle information, and include a display part for displaying the vehicle information. According to one or more embodiments of the present invention, the mobile terminal 113 is constructed by a mobile phone, a smartphone, a Personal Digital Assistance (PDA), a portable music player, or a portable game machine.

Hereinafter, the case that the mobile terminal 113 is the smartphone including a display operation part 131 constructed by a touch panel as illustrated in FIG. 1 will be described by way of example.

Figure 2:
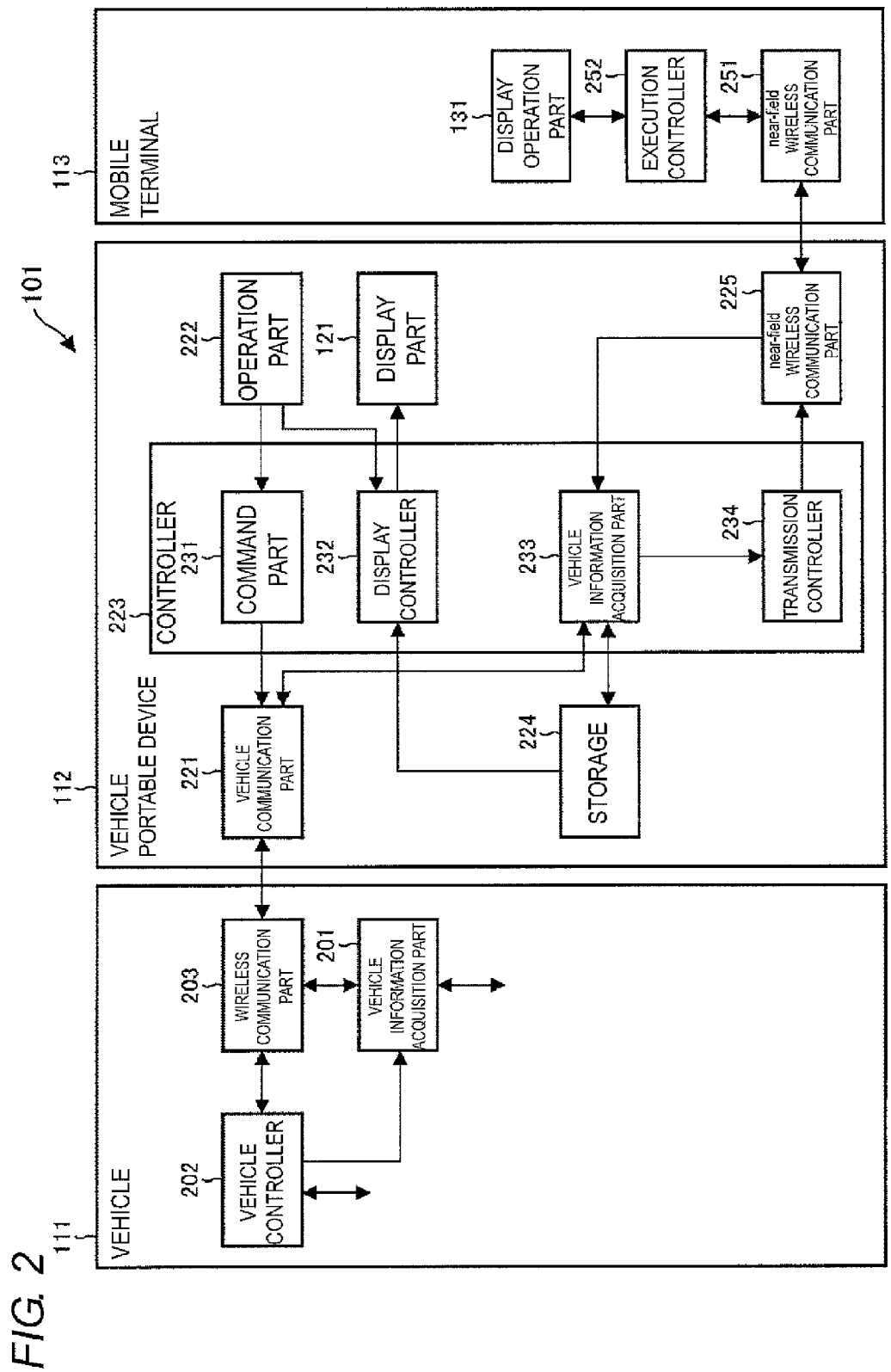
FIG. 2 is a block diagram illustrating a configuration example of a function of each part of the information communication system.

1-2. Configuration Example of Function of Each Part of Information Communication System FIG. 2 is a block diagram illustrating a configuration example of functions of the vehicle 111, the vehicle portable device 112, and the mobile terminal 113.

The vehicle 111 has functions including a vehicle information acquisition part 201, a vehicle controller 202, and a wireless communication part 203.

The vehicle information acquisition part 201 acquires various pieces of information (vehicle information), such as a state of the vehicle 111, from each part of the vehicle 111, and supplies the acquired vehicle information to the wireless communication part 203.

There is no particular limitation to the vehicle information acquired by the vehicle information acquisition part 201. Examples of the vehicle information include a battery charge amount, a remaining amount of fuels, such as gasoline, a door lock state, lighting and turn-off states of various lamps and lights (such as a headlight, a room light, a hazard lamp, and a fog lamp), open and close states of a window, a running distance, a vehicle interior temperature, a parking time, and a parking position.

The vehicle controller 202 includes arithmetic processing units, such as a CPU (Central Processing Unit), or control units, such as an ECU (Electronic Control Unit), and controls each part of the vehicle 111. According to one or more embodiments of the present invention, the vehicle controller 202 controls the lock and unlock of the door of the vehicle 111. The vehicle controller 202 supplies the command and the information, which are transmitted to the vehicle portable device 112, to the wireless communication part 203. The vehicle controller 202 supplies information indicating the state of the vehicle 111, such as the lock and unlock of the door of the vehicle 111 to the vehicle information acquisition part 201.

The wireless communication part 203 includes an antenna and a communication device (including a communication chip), and conducts the wireless communication with a vehicle communication part 221 of the vehicle portable device 112 by a predetermined communication system to transmit and receive various commands and pieces of information to and from each other. The wireless communication part 203 supplies the command and the information, which are received from the vehicle portable device 112, to the vehicle information acquisition part 201 and the vehicle controller 202.

The vehicle portable device 112 has functions including the vehicle communication part 221, an operation part 222, a controller 223, a storage 224, and a near-field wireless communication part 225 in addition to the display part 121 in FIG. 1.

The vehicle communication part 221 includes an antenna and a communication device (including a communication chip), and conducts the wireless communication with the wireless communication part 203 of the vehicle 111 by a predetermined communication system to transmit and receive various commands and pieces of information to and from each other. The vehicle communication part 221 supplies the vehicle information, which is received from the vehicle 111, to the vehicle information acquisition part 233 of the controller 223.

The operation part 222 includes the button 122 and the like in FIG. 1, and a command to the vehicle 111 to lock and unlock the door and a command to the vehicle portable device 112 to display the vehicle information on the display part 121 are inputted through the operation part 222. The operation part 222 supplies the inputted command to a command part 231 or a display controller 232 of the controller 223 as needed basis.

The controller 223 includes arithmetic processing units, such as a CPU, and has functions including the command part 231, the display controller 232, a vehicle information acquisition part 233, and a transmission controller 234.

The command part 231 transmits the command, which is inputted using the operation part 222, to the vehicle 111 through the vehicle communication part 221.

In the case that the command to display part of the vehicle information is inputted using the operation part 222, the display controller 232 reads the vehicle information from the storage 224 and displays the vehicle information on the display part 121. According to one or more embodiments of the present invention, a battery charge state of the vehicle 111 is displayed on the display part 121.

The vehicle information acquisition part 233 supplies the vehicle information, which is supplied from the vehicle communication part 221, to the transmission controller 234, and stores the vehicle information in the storage 224 together with acquired time information indicating an acquired time. The vehicle information acquisition part 233 reads the acquired time information on each piece of vehicle information and update deadline information indicating an update deadline of each vehicle from the storage 224 to determine whether the vehicle information requires an update. The vehicle information acquisition part 233 reads the vehicle information, which is transmitted to the mobile terminal 113, from the storage 224, and supplies the vehicle information to the transmission controller 234.

The transmission controller 234 controls the near-field wireless communication part 225 to transmit the vehicle information to the mobile terminal 113 by near-field wireless communication.

The vehicle information acquired from the vehicle 111 is stored in the storage 224 together with the acquired time information. The update deadline information is also stored in the storage 224.

The near-field wireless communication part 225 includes an antenna and a communication device (including a communication chip), and conducts the near-field wireless communication with a near-field wireless communication part 251 of the mobile terminal 113 by a predetermined communication system to transmit and receive various commands and pieces of information to and from each other. The near-field wireless communication part 225 supplies the command and the information, which are received from the mobile terminal 113, to the vehicle information acquisition part 233, and notifies the vehicle information acquisition part 233 that the near-field wireless communication with the mobile terminal 113 is established.

The mobile terminal 113 has functions including the near-field wireless communication part 251 and an execution controller 252 in addition to the display operation part 131 in FIG. 1.

The near-field wireless communication part 251 includes an antenna and a communication device (including a communication chip), and conducts the near-field wireless communication with the near-field wireless communication part 225 of the mobile terminal 113 by a predetermined communication system to transmit and receive various commands and pieces of information to and from each other. The near-field wireless communication part 251 supplies the command and the information, which are received from the vehicle portable device 112, to the execution controller 252, and notifies the execution controller 252 that the near-field wireless communication with the vehicle portable device 112 is established.

The execution controller 252 includes arithmetic processing units, such as a CPU, and executes a vehicle information display program to display the vehicle information, which is acquired from the vehicle 111 through the vehicle portable device 112, on the display operation part 131. The execution controller 252 supplies the command and the information, which are transmitted to the vehicle 111 or the vehicle portable device 112, to the near-field wireless communication part 251.

The display operation part 131 displays various pieces of information including the vehicle information and an operation screen.

The display operation part 131 is used to input the command to the vehicle 111 or the mobile terminal 113, and supplies the input command to the execution controller 252.

1-3. Processing of Information Communication System

Processing of the information communication system 101 will be described below with reference to FIGS. 3 to 12.

(Vehicle Information Transmitting Processing Performed by Vehicle)

Figure 3:
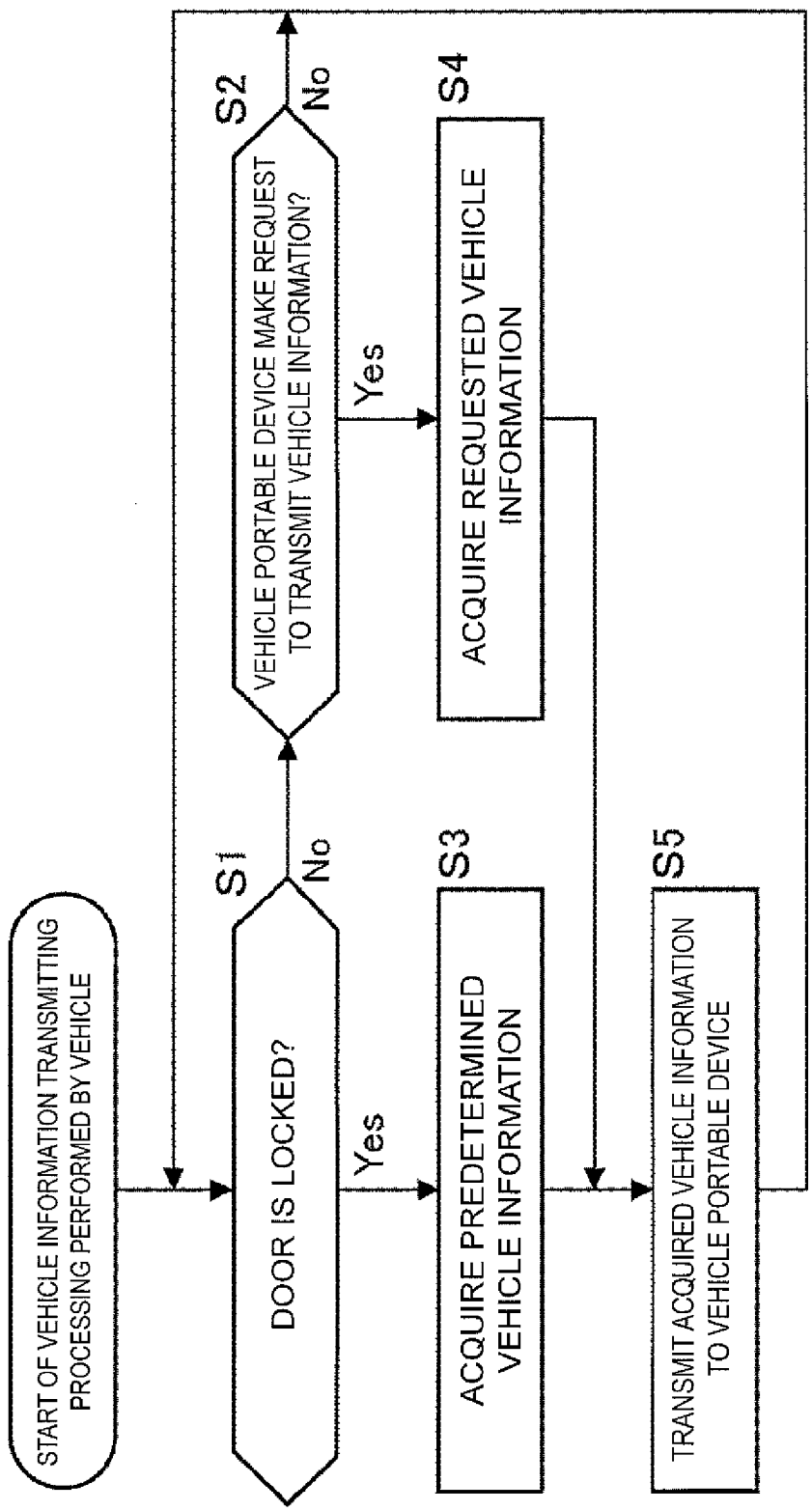
FIG. 3 is a flowchart illustrating a vehicle information transmitting processing by a vehicle.

Vehicle information transmitting processing performed by the vehicle 111 will be described with reference to a flowchart in FIG. 3.

In Step S1, the vehicle information acquisition part 201 determines whether the door is locked based on the information from the vehicle controller 202. When the door is not locked, the processing proceeds to Step S2.

In Step S2, the vehicle information acquisition part 201 determines whether the vehicle portable device 112 makes a request to transmit the vehicle information. When the vehicle portable device 112 does not make the request to transmit the vehicle information, the processing returns to Step S1.

The pieces of processing in Steps S1 and S2 are repeatedly performed until the determination that the door is locked is made in Step S1 or the determination that the vehicle portable device 112 makes the request to transmit the vehicle information is made in Step S2.

On the other hand, when the determination that the door is locked is made in Step S1, the processing proceeds to Step S3.

In Step S3, the vehicle information acquisition part 201 acquires predetermined vehicle information from each part of the vehicle 111. As used herein, the predetermined vehicle information means all pieces of vehicle information that can be displayed in the mobile terminal 113.

Then the processing proceeds to Step S5.

On the other hand, when receiving a request signal for making the request to transmit the vehicle information from the vehicle portable device 112 through the wireless communication part 203 in Step S2, the vehicle information acquisition part 201 determines that the vehicle portable device 112 makes the request to transmit the vehicle information. Then the processing proceeds to Step S4.

In Step S4, the vehicle information acquisition part 201 acquires the vehicle information, which is requested by the vehicle portable device 112, from each unit of the vehicle 111.

Then the processing proceeds to Step S5.

In Step S5, the vehicle information acquisition part 201 transmits a transmission signal including the acquired vehicle information to the vehicle portable device 112 through the wireless communication part 203.

At this point, because the authentication processing is already performed between the vehicle 111 and the vehicle portable device 112 in order to lock the door or receive the request signal, it is not always necessary to perform the authentication processing.

Then the processing returns to Step S1 to perform the pieces of processing from Step S1.

(Processing Performed by Vehicle Portable Device when Vehicle Information is Transmitted while Door is Locked)

Then, processing performed by the vehicle portable device 112 when the vehicle information is transmitted while the door of the vehicle 111 is locked will be described with reference to a flowchart in FIG. 4.

Figure 4:
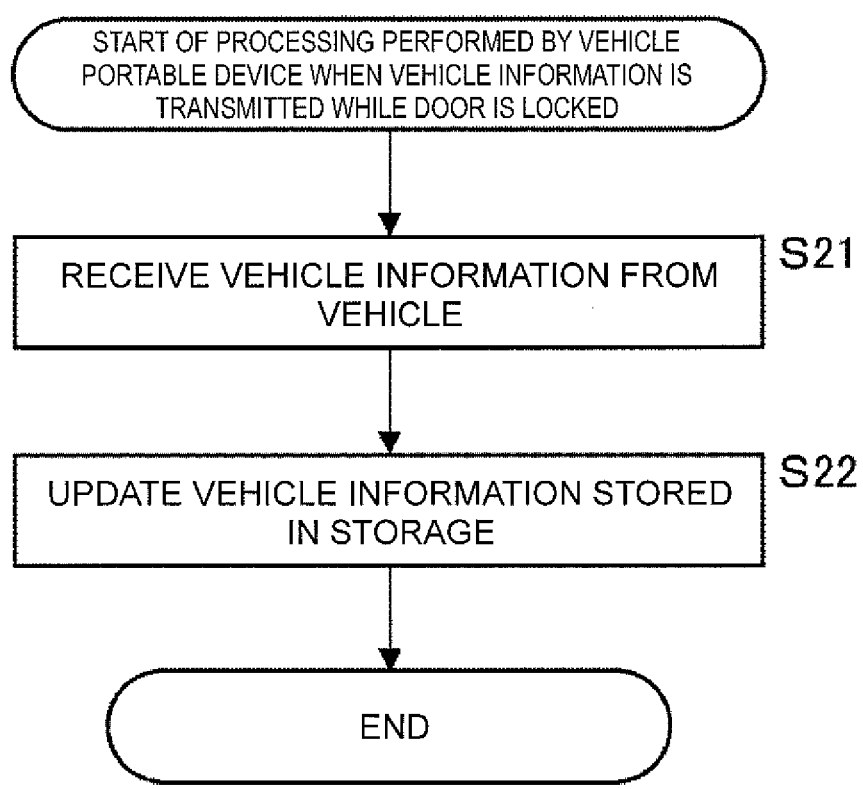
FIG. 4 is a flowchart illustrating processing of a vehicle portable device when vehicle information is transmitted while a door is locked.

In Step S21, the vehicle information acquisition part 233 receives the vehicle information, which is transmitted from the vehicle 111 in Step S5 in FIG. 4, through the vehicle communication part 221.

In Step S22, the vehicle information acquisition part 233 updates the vehicle information stored in the storage 224. Specifically, the vehicle information acquisition part 233 replaces the old vehicle information stored in the storage 224 with the vehicle information received newly from the vehicle 111, and updates the acquired time information indicating the time when the vehicle information is acquired. The vehicle information that is not stored in the storage 224 yet is directly stored in the storage 224 together with the acquired time information.

Then the processing is ended.

(Processing in the Case where Mobile Terminal Acquires Vehicle Information from Vehicle and Displays Vehicle Information)

Figure 5:
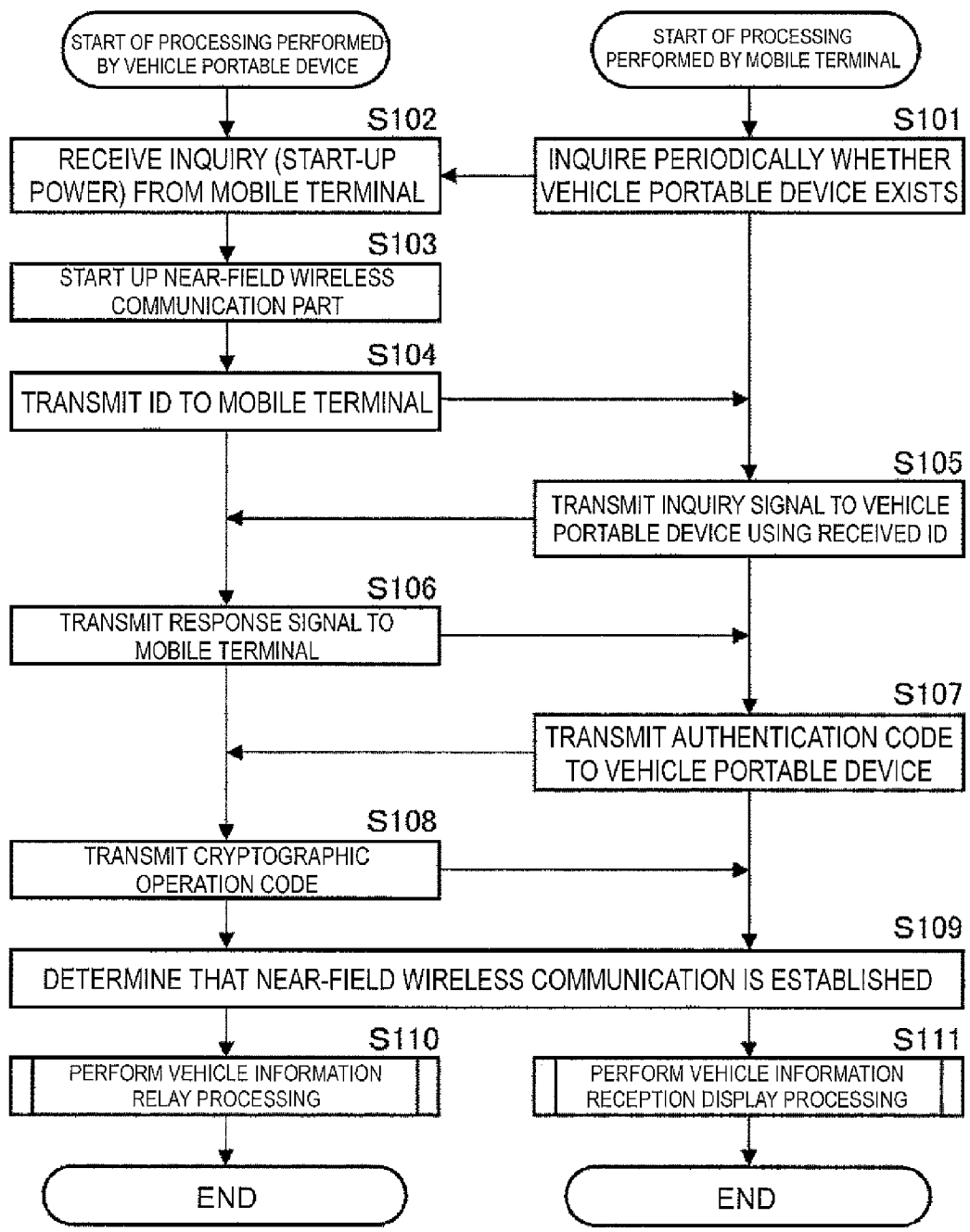
FIG. 5 is a flowchart illustrating processing when a mobile terminal acquires the vehicle information from the vehicle and displays the vehicle information.

Then, processing in the case where the mobile terminal 113 acquires the vehicle information from vehicle 111 and displays the vehicle information will be described with reference to a flowchart in FIG. 5.

In Step S101, according to one or more embodiments of the present invention, the near-field wireless communication part 251 of the mobile terminal 113 transmits a polling signal at predetermined time intervals to periodically inquire whether the vehicle portable device 112 exists.

Figure 6:
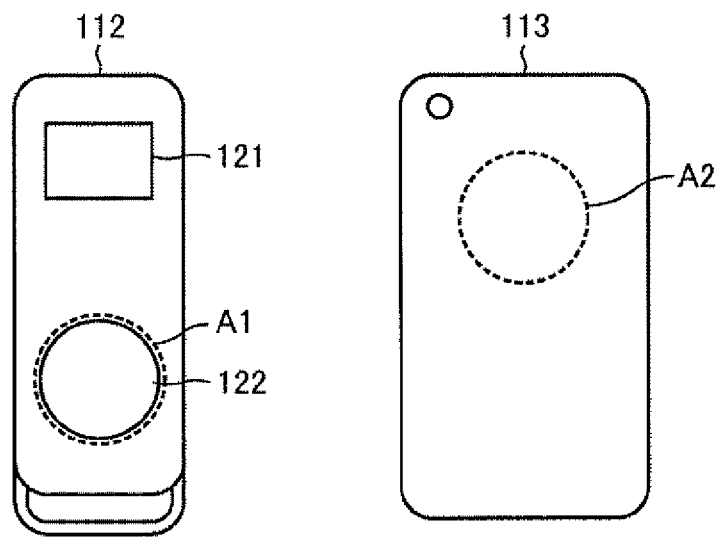
FIG. 6 is a view illustrating an example of positions of antennas of the vehicle portable device and the mobile terminal.
Figure 7:
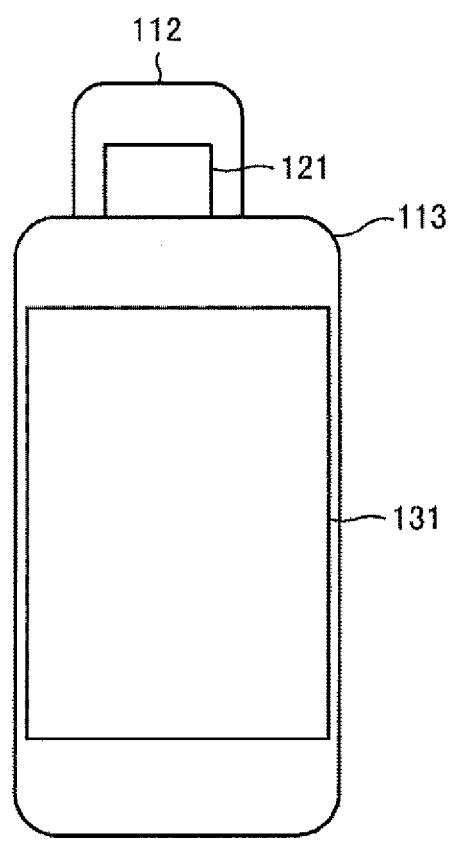
FIG. 7 is a view illustrating a state in which the vehicle portable device and the mobile terminal comes close to each other.

In Step S102, the vehicle portable device 112 receives the inquiry (a start-up power) from the mobile terminal 113. According to one or more embodiments of the present invention, in the case where an antenna for the near-field wireless communication is provided near each of a domain A1 surrounded by a dotted line in a front surface of the vehicle portable device 112 and a domain A2 surrounded by a dotted line in a rear surface of the mobile terminal 113 as illustrated in FIG. 6, the front surface of the vehicle portable device 112 and the rear surface of the mobile terminal 113 come close to each other or contact each other such that the domain A1 and the domain A2 overlap each other as illustrated in FIG. 7, whereby the start-up power is supplied from the mobile terminal 113 to the vehicle portable device 112 by electromagnetic induction between the antennas of the mobile terminal 113 and the vehicle portable device 112.

In Step S103, the near-field wireless communication part 225 of the vehicle portable device 112 is started up by the start-up power from the mobile terminal 113.

In Step S104, the near-field wireless communication part 225 of the vehicle portable device 112 transmits an ID to the mobile terminal 113. Specifically, the near-field wireless communication part 225 receives the polling signal transmitted from the mobile terminal 113, and transmits an authentication request signal including an ID of the vehicle portable device 112 to the mobile terminal 113 in response to the polling signal.

In Step S105, the near-field wireless communication part 251 of the mobile terminal 113 transmits an inquiry signal to the vehicle portable device 112 using the received ID. Specifically, the near-field wireless communication part 251 receives the authentication request signal transmitted from the vehicle portable device 112, and reads the ID of the vehicle portable device 112 from the received authentication request signal. When determining that the read ID of the vehicle portable device 112 is the valid ID, the near-field wireless communication part 251 generates the inquiry signal using the ID of the vehicle portable device 112, and transmits the inquiry signal to the vehicle portable device 112.

In Step S106, the near-field wireless communication part 225 of the vehicle portable device 112 receives the inquiry signal transmitted from the mobile terminal 113, and transmits a response signal to the mobile terminal 113 in response to the response signal.

In Step S107, the near-field wireless communication part 251 of the mobile terminal 113 transmits an authentication code to the vehicle portable device 112. Specifically, the near-field wireless communication part 251 receives the response signal transmitted from the vehicle portable device 112, and transmits the authentication signal including an authentication code of the mobile terminal 113 in response to the response signal.

In Step S108, the near-field wireless communication part 225 of the vehicle portable device 112 transmits a cryptographic operation code. Specifically, the near-field wireless communication part 225 receives the authentication signal transmitted from the mobile terminal 113, and reads the authentication code of the mobile terminal 113 from the authentication signal. The near-field wireless communication part 225 encrypts the read authentication signal by a predetermined system to generate the cryptographic operation code. The near-field wireless communication part 225 transmits the response signal including the generated cryptographic operation code to the mobile terminal 113.

In Step S109, the vehicle portable device 112 and the mobile terminal 113 determine that the near-field wireless communication is established. Specifically, the near-field wireless communication part 251 of the mobile terminal 113 receives the response signal transmitted from the vehicle portable device 112, and reads the cryptographic operation code included in the response signal. The near-field wireless communication part 251 authenticates the vehicle portable device 112 using the authentication code of the mobile terminal 113 and the received cryptographic operation code. When successfully authenticating the vehicle portable device 112, the near-field wireless communication part 251 determines that the near-field wireless communication with the near-field wireless communication part 225 of the vehicle portable device 112 is established.

When transmitting the cryptographic operation code (Step S108), the near-field wireless communication part 225 of the vehicle portable device 112 determines that the near-field wireless communication with the mobile terminal 113 is established.

The near-field wireless communication part 225 notifies the vehicle information acquisition part 233 that the near-field wireless communication with the mobile terminal 113 is established. The near-field wireless communication part 251 of the mobile terminal 113 notifies the execution controller 252 that the near-field wireless communication with the vehicle portable device 112 is established.

When any one of the pieces of processing in Steps S104 to S109 is not successfully performed, the near-field wireless communication is not established between the vehicle portable device 112 and the mobile terminal 113, and the processing is ended.

Then, the vehicle portable device 112 performs vehicle information relay processing in Step S110, and the mobile terminal 113 performs vehicle information reception display processing in Step S111.

The vehicle information relay processing in Step S110 performed by the vehicle portable device 112 will be described in detail with reference to a flowchart in FIG. 8.

In Step S131, the vehicle information acquisition part 233 determines whether a predetermined time period elapses since the door of the vehicle 111 is locked. When the predetermined time period elapses since the door of the vehicle 111 is locked (more strictly, since the vehicle information is received from the vehicle 111 while the door is locked through the processing in FIG. 4), the processing proceeds to Step S132.

According to one or more embodiments of the present invention, the time period is set to a time during which there is a low possibility of changing the pieces of vehicle information until the time period elapses since the door of the vehicle 111 is locked.

In Step S132, the vehicle information acquisition part 233 acquires current time information from a timer (not illustrated).

In Step S133, the vehicle information acquisition part 233 checks an elapsed time since each piece of vehicle information is acquired. Specifically, the vehicle information acquisition part 233 reads the acquired time information on each piece of vehicle information, which is stored in the storage 224, from the storage 224. The vehicle information acquisition part 233 calculates the elapsed time until the current time from the acquired time with respect to each piece of vehicle information.

In Step S134, the vehicle information acquisition part 233 compares the elapsed time of each piece of vehicle information to the update deadline. Specifically, the vehicle information acquisition part 233 reads the update deadline information indicating the update deadline of each piece of vehicle information from the storage 224. The vehicle information acquisition part 233 compares the elapsed time to the update deadline in each piece of vehicle information.

According to one or more embodiments of the present invention, the update deadline of each piece of vehicle information is previously set in each piece of vehicle information based on an important degree or a characteristic of the information. According to one or more embodiments of the present invention, update deadlines of the vehicle information, such as a weather around the vehicle 111, which change momentarily, are set short. On the other hand, according to one or more embodiments of the present invention, update deadlines of the vehicle information, such as a battery remaining amount of the vehicle 111, which change moderately, are set longer. According to one or more embodiments of the present invention, update deadlines of the vehicle information, such as the lock state of the door of the vehicle 111, which do not change unless a user boards on or drives the vehicle 111, are set to an indefinite period. According to one or more embodiments of the present invention, the update deadline of the important vehicle information in which correctness is required is set short, and the update deadline of the vehicle information in which the correctness is not required too much is set long.

In Step S135, the vehicle information acquisition part 233 determines whether the vehicle information that requires the update exists based on a result of the processing in Step S134. When the vehicle information that requires the update exists, the processing proceeds to Step S136.

The vehicle information that requires the update includes the vehicle information not stored in the storage 224 in addition to the vehicle information in which the elapsed time is past the update deadline.

In Step S136, the vehicle portable device 112 makes a request to the vehicle 111 to transmit the vehicle information that requires the update. Specifically, the vehicle information acquisition part 233 causes the vehicle communication part 221 to transmit the request signal for making the request to transmit the vehicle information that requires the update.

The vehicle communication part 221 tries to establish the wireless communication with the wireless communication part 203 of the vehicle 111. The authentication processing and the like are performed between the wireless communication part 203 and the vehicle communication part 221 according to a predetermined protocol, and the wireless communication is established between the wireless communication part 203 and the vehicle communication part 221 when all the pieces of processing are successfully performed. When the wireless communication is established between the wireless communication part 203 and the vehicle communication part 221, the vehicle communication part 221 transmits the request signal to the wireless communication part 203 of the vehicle 111.

In Step S137, the vehicle information acquisition part 233 determines whether the vehicle information is received within a predetermined time. Specifically, when receiving the request signal from the vehicle communication part 221, the vehicle 111 transmits the transmission signal including the requested vehicle information to the vehicle portable device 112 in Step S5 in FIG. 3. When receiving the transmission signal transmitted from the vehicle 111 through the vehicle communication part 221 within the predetermined time since the transmission of the vehicle information that requires the update is requested, the vehicle information acquisition part 233 determines that the vehicle information is received within the predetermined time. Then the processing proceeds to Step S138.

In Step S138, the vehicle information stored in the storage 224 is updated similarly to the processing in Step S22 in FIG. 4.

Then the processing proceeds to Step S139.

On the other hand, when the vehicle information is not received from the vehicle 111 within the predetermined time in Step S137, the processing in Step S138 is skipped, and the processing proceeds to Step S139. According to one or more embodiments of the present invention, the vehicle information is not received within the predetermined time, when the vehicle 111 does not exist within a communication range of the vehicle portable device 112, when the communication is not established between the vehicle 111 and the vehicle portable device 112 due to an authentication error and the like, or when a communication error occurs in midstream.

When the vehicle information that requires the update does not exist in Step S135, the pieces of processing in Steps S136 to S138 are skipped, and the processing proceeds to Step S139.

When the determination that the predetermined time does not elapse since the door of the vehicle 111 is locked is made in Step S131, the pieces of processing in Steps S132 to S138 are skipped, and the processing proceeds to Step S139.

In Step S139, the vehicle portable device 112 transmits the vehicle information and acquired time to the mobile terminal 113. Specifically, the vehicle information acquisition part 233 reads all the pieces of vehicle information, which are stored in the storage 224, from the storage 224 together with the acquired time information, and supplies the pieces of vehicle information and the acquired time information to the transmission controller 234. The transmission controller 234 generates the transmission signal including the vehicle information and the acquired time information, and transmits the transmission signal to the mobile terminal 113 through the near-field wireless communication part 225.

Then the vehicle information relay processing is ended.

Figure 9:
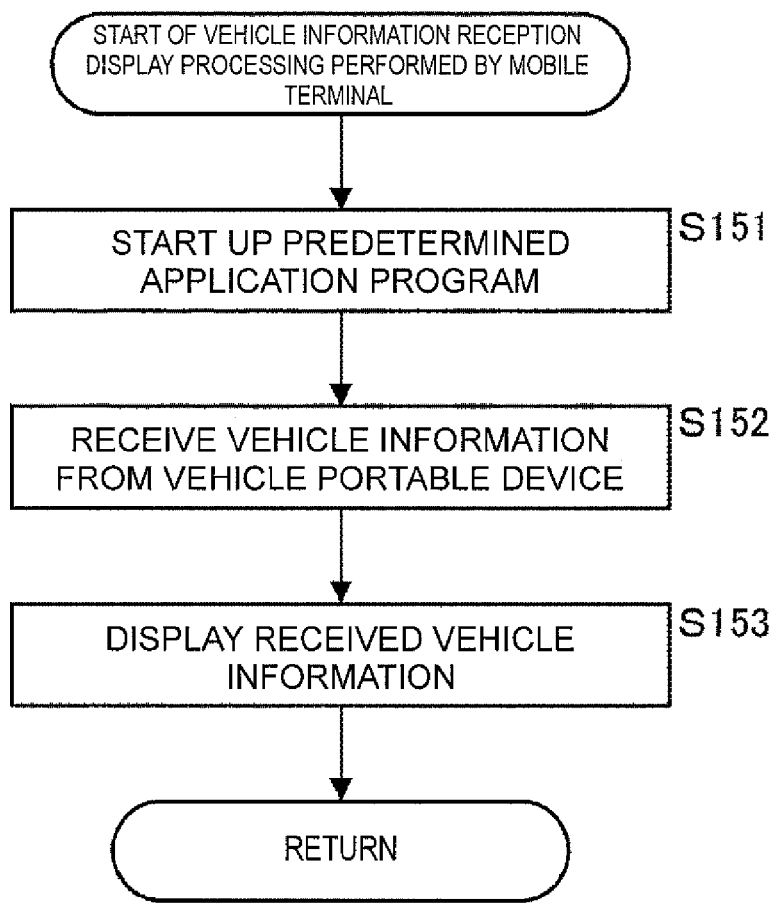
FIG. 9 is a flowchart illustrating vehicle information reception display processing performed by the mobile terminal.

Subsequently, the vehicle information reception display processing in Step S111 in FIG. 5 performed by the mobile terminal 113 will be described in detail with reference to a flowchart in FIG. 9.

In Step S151, the execution controller 252 starts up a predetermined application program (that is, the vehicle information display program). Therefore, when the near-field wireless communication is established between the vehicle portable device 112 and the mobile terminal 113, the vehicle information display program is automatically started up in the mobile terminal 113.

Figure 8:
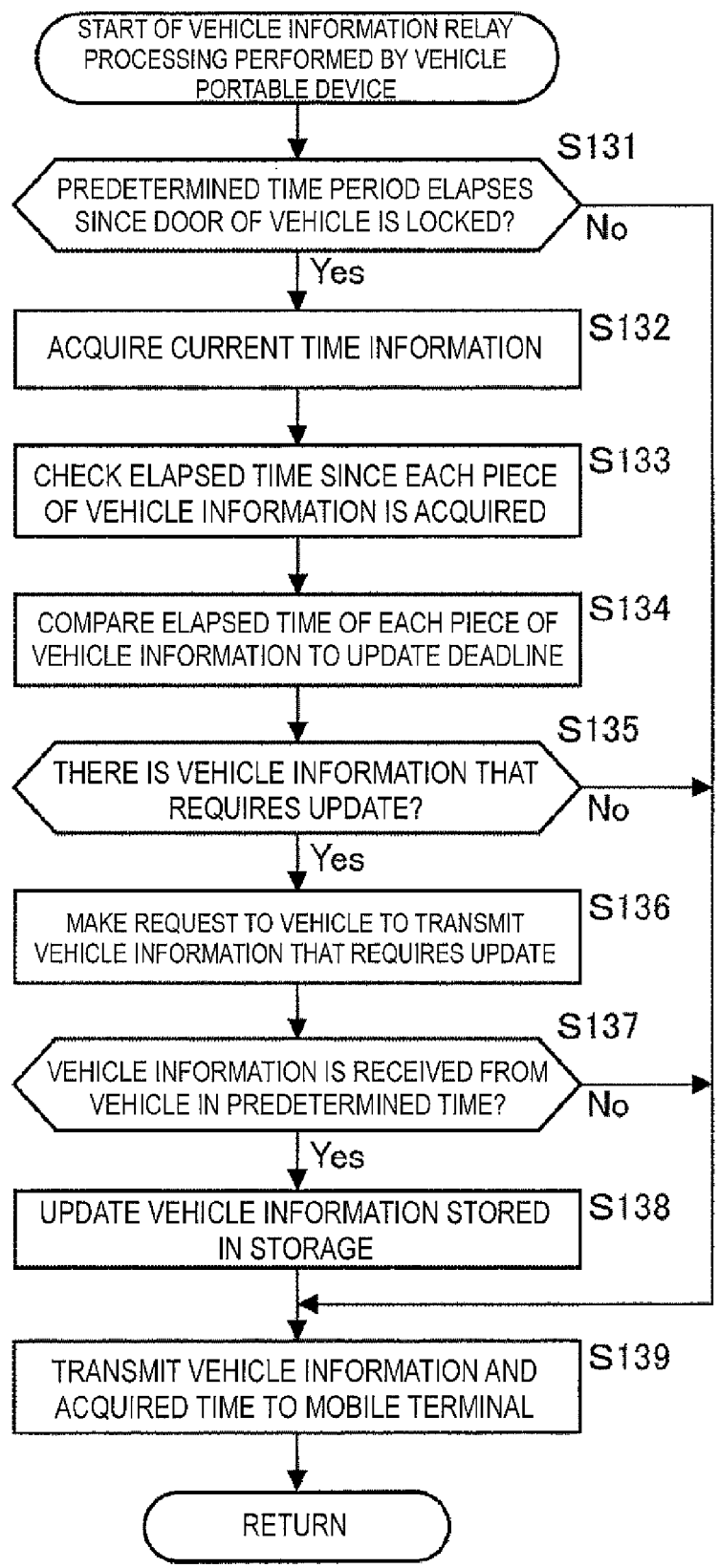
FIG. 8 is a flowchart illustrating vehicle information relay processing performed by the vehicle portable device.

In Step S152, the execution controller 252 receives the vehicle information, which is transmitted from the vehicle portable device 112 in Step S139 in FIG. 8 as described, through the near-field wireless communication part 251.

In Step S153, the display operation part 131 displays the received vehicle information under the control of the execution controller 252. Then the processing is ended.

Figure 10:
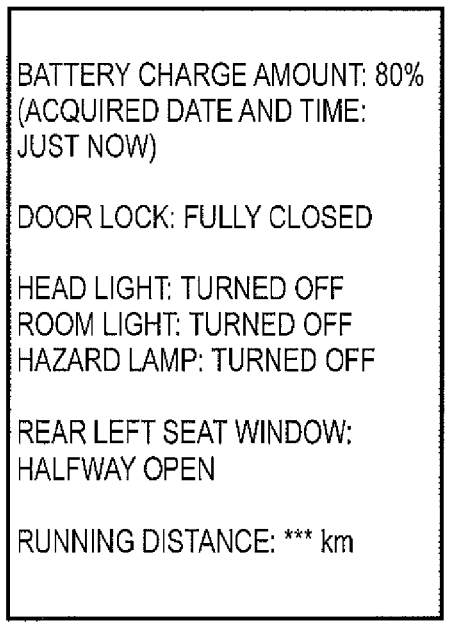
FIG. 10 is a view illustrating a first display example of the vehicle information in a display operation part of the mobile terminal.

FIGS. 10 to 12 illustrate display examples of the vehicle information in the display operation part 131 of the mobile terminal 113. The battery charge amount, the open and close states of the door lock, the lighting and turn-off states of the headlight, the room light, and the hazard lamp, the open and close states of the window, and the running distance are displayed in the examples in FIGS. 10 to 12. In the example in FIG. 10, according to one or more embodiments of the present invention, the battery charge amount is 80%, all the door locks are closed, all the headlight, the room light, and the hazard lamp are turned off, the window of the rear left seat is halfway open, and the running distance is indicated by a specific numerical value.

The vehicle information that is possibly updated is indicated together with the acquired time. According to one or more embodiments of the present invention, the information on the battery charge amount is acquired just now in the example in FIG. 10, the information on the battery charge amount is acquired 10 minutes ago in the example in FIG. 11, and the information on the battery charge amount is acquired 17:30 January 1st as the specific time and date in the example in FIG. 12.

As described above, the user can check the vehicle information on the vehicle 111 using the mobile terminal 113 by the simple operation to bring the mobile terminal 113 close to or into contact with the vehicle portable device 112. At this point, the vehicle information is not displayed on the vehicle portable device 112, so that the power consumption of the vehicle portable device 112 can be suppressed.

The vehicle information is not acquired from the vehicle 111 for the predetermined time period since the door of the vehicle 111 is locked, but the vehicle information stored in the vehicle portable device 112 is transmitted to the mobile terminal 113. Therefore, the communication amount between the vehicle 111 and the vehicle portable device 112 can be reduced to suppress the power consumption of the vehicle portable device 112, and the response time until the vehicle information is displayed on the mobile terminal 113 can be shortened.

Only the vehicle information that requires the update is acquired from the vehicle 111, and the vehicle information stored in the vehicle portable device 112 is transmitted to the mobile terminal 113 in any other cases. Therefore, while the user can always check the latest vehicle information, the communication amount between the vehicle 111 and the vehicle portable device 112 can be reduced to suppress the power consumption of the vehicle portable device 112, and the response time until the vehicle information is displayed on the mobile terminal 113 can be shortened.

In the case that the vehicle portable device 112 cannot conduct the wireless communication with the vehicle 111 to acquire the vehicle information from the vehicle 111 within the predetermined time, the vehicle portable device 112 does not perform retry, but transmits the vehicle information stored in the own vehicle portable device 112 to the mobile terminal 113. Therefore, the power consumption of the vehicle portable device 112 can be suppressed.

2. Modification

Hereinafter, embodiments of the invention will be described with reference to the drawings.

The authentication method between the vehicle 111 and the vehicle portable device 112 and the authentication method between the vehicle portable device 112 and the mobile terminal 113 are not limited to the examples of the embodiment, but any authentication method may be adopted.

The information on the update deadline may be transmitted from the vehicle 111 to the vehicle portable device 112 together with the vehicle information, according to one or more embodiments of the present invention.

The display part 121 and the button 122 are not necessarily provided in the vehicle portable device 112.

There is no particular limitation to the type of the vehicle 111, but any type of the vehicle may be used.

The programs, which are executed by the vehicle 111, the vehicle portable device 112, and the mobile terminal 113 in order to perform the above pieces of processing, may be programs in which the processing is performed in time series along a procedure described in the embodiment or programs in which the processing is performed in parallel or in necessary timing such that a call is performed.

In the specification, the system means a set of a plurality of constituents (such as a device and a module (component)) regardless whether all the constituents exist in the same chassis. Accordingly, the system includes a plurality of devices, each of which is accommodated in the individual chassis and connected through a network, and one device in which a plurality of modules are accommodated in one chassis.

The present invention is not limited to the embodiments described above, but various changes can be made without departing from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An information communication system comprising:
 a vehicle portable device that conducts wireless communication with a vehicle; and
 a mobile terminal that includes a display part and conducts near-field wireless communication with the vehicle portable device,
 wherein the vehicle portable device includes:
  a vehicle information acquisition part that acquires vehicle information on the vehicle, wherein the vehicle information is transmitted from the vehicle by wireless communication; and a transmission controller that controls the transmission of the vehicle information to the mobile terminal by near-field wireless communication, wherein the mobile terminal includes an execution controller that acquires the vehicle information transmitted from the vehicle portable device and controls execution of a predetermined program for displaying the vehicle information on the display part, and wherein, when the near-field wireless communication is established between vehicle portable device and the mobile terminal:

the vehicle information acquisition part acquires the vehicle information from the vehicle, the transmission controller transmits the vehicle information acquired from the vehicle to the mobile terminal, and the execution controller starts up the program, acquires the vehicle information transmitted from the vehicle portable device, and displays the vehicle information on the display part, wherein the vehicle portable device is used to lock and unlock a door of the vehicle by wireless communication and further includes a storage in which the vehicle information is stored, wherein, when the door of the vehicle is locked:

the vehicle information acquisition part acquires the vehicle information from the vehicle and stores the acquired vehicle information in the storage, wherein, when the vehicle and the vehicle portable device can conduct the wireless communication with each other while the near-field wireless communication is established between the vehicle portable device and the mobile terminal:

the vehicle information acquisition part acquires the vehicle information from the vehicle and updates the vehicle information stored in the storage, and the transmission controller transmits the vehicle information acquired from the vehicle to the mobile terminal, and wherein, when the vehicle and the vehicle portable device cannot conduct the wireless communication with each other while the near-field wireless communication is established between the vehicle portable device and the mobile terminal:

the transmission controller transmits the vehicle information stored in the storage to the mobile terminal.

2. The information communication system according to claim 1, wherein the vehicle information acquisition part stores acquired time information indicating a time the vehicle information is acquired in the storage together with vehicle information, and wherein the transmission controller transmits the acquired time information to the mobile terminal together with the vehicle information.

3. The information communication system according to claim 2, wherein, when the vehicle and the vehicle portable device can conduct the wireless communication with each other while the near-field wireless communication is established between the vehicle portable device and the mobile terminal:

the vehicle information acquisition part determines whether the vehicle information stored in the storage requires an update, acquires the vehicle information that requires the update from the vehicle, and updates the vehicle information stored in the storage, and the transmission controller transmits the vehicle information acquired from the vehicle by the vehicle information acquisition part to the mobile terminal with respect to the vehicle information that requires the update, and transmits the vehicle information stored in the storage to the mobile terminal with respect to the vehicle information that does not require the update.

4. The information communication system according to claim 2, wherein the vehicle information acquisition part stops the acquisition of the vehicle information from the vehicle for a predetermined time period since the door of the vehicle is locked, and wherein, when the near-field wireless communication is established between the vehicle portable device and the mobile terminal within the predetermined time period since the door of the vehicle is locked:

the transmission controller transmits the vehicle information stored in the storage to the mobile terminal regardless whether the vehicle and the vehicle portable device can conduct the wireless communication with each other.

5. The information communication system according to claim 1, wherein, when the vehicle and the vehicle portable device can conduct the wireless communication with each other while the near-field wireless communication is established between the vehicle portable device and the mobile terminal:

the vehicle information acquisition part determines whether the vehicle info nation stored in the storage requires an update, acquires the vehicle information that requires the update from the vehicle, and updates the vehicle information stored in the storage, and the transmission controller transmits the vehicle information acquired from the vehicle by the vehicle information acquisition part to the mobile terminal with respect to the vehicle information that requires the update, and transmits the vehicle information stored in the storage to the mobile terminal with respect to the vehicle information that does not require the update.

6. The information communication system according to claim 5, wherein the vehicle information acquisition part stops the acquisition of the vehicle information from the vehicle for a predetermined time period since the door of the vehicle is locked, and wherein, when the near-field wireless communication is established between the vehicle portable device and the mobile terminal within the predetermined time period since the door of the vehicle is locked:

the transmission controller transmits the vehicle information stored in the storage to the mobile terminal regardless whether the vehicle and the vehicle portable device can conduct the wireless communication with each other.

7. The information communication system according to claim 1, wherein the vehicle information acquisition part stops the acquisition of the vehicle information from the vehicle for a predetermined time period since the door of the vehicle is locked, and wherein, when the near-field wireless communication is established between the vehicle portable device and the mobile terminal within the predetermined time period since the door of the vehicle is locked:
the transmission controller transmits the vehicle information stored in the storage to the mobile terminal regardless whether the vehicle and the vehicle portable device can conduct the wireless communication with each other.

8. A vehicle portable device comprising:
a wireless communication part that conducts wireless communication with a vehicle;
a near-field wireless communication part that conducts near-field wireless communication with a mobile terminal, wherein the mobile terminal includes a display part for displaying vehicle information on the vehicle;
a vehicle information acquisition part that acquires the vehicle information transmitted from the vehicle by wireless communication; and
a transmission controller that controls the vehicle information transmitted to the mobile terminal by near-field wireless communication,
wherein, when the near-field wireless communication with a mobile terminal is established:
the vehicle information acquisition part acquires the vehicle information from the vehicle, and
the transmission controller transmits the vehicle information acquired from the vehicle to the mobile terminal,
wherein the vehicle portable device further comprises:
a storage in which the vehicle information is stored, the vehicle portable device being used to lock and unlock a door of the vehicle by wireless communication,
wherein, when the door of the vehicle is locked:
the vehicle information acquisition part acquires the vehicle information from the vehicle and stores the acquired vehicle information in the storage,
wherein, when the wireless communication with the vehicle can be conducted while the near-field wireless communication with the mobile terminal is established:
the vehicle information acquisition part acquires the vehicle information from the vehicle and updates the vehicle information stored in the storage, and
the transmission controller transmits the vehicle information acquired from the vehicle to the mobile terminal, and
wherein, when the wireless communication with the vehicle cannot be conducted while the near-field wireless communication with the mobile terminal is established:
the transmission controller transmits the vehicle information stored in the storage to the mobile terminal.

9. The vehicle portable device according to claim 8,
wherein the vehicle information acquisition part stores acquired time information indicating a time the vehicle information is acquired in the storage together with vehicle information, and
wherein the transmission controller transmits the acquired time information to the mobile terminal together with the vehicle information.

10. The vehicle portable device according to claim 9,
wherein, when the vehicle and the vehicle portable device can conduct the wireless communication with each other while the near-field wireless communication with the mobile terminal is established:
the vehicle information acquisition part determines whether the vehicle information stored in the storage requires an update, acquires the vehicle information that requires the update from the vehicle, and updates the vehicle information stored in the storage, and
the transmission controller transmits the vehicle information acquired from the vehicle by the vehicle information acquisition part to the mobile terminal with respect to the vehicle information that requires the update, and transmits the vehicle information stored in the storage to the mobile terminal with respect to the vehicle information that does not require the update.

11. The vehicle portable device according to claim 9,
wherein the vehicle information acquisition part stops the acquisition of the vehicle information from the vehicle for a predetermined time period since the door of the vehicle is locked, and
wherein, when the near-field wireless communication with the mobile terminal is established within the predetermined time period since the door of the vehicle is locked, the transmission controller transmits the vehicle information stored in the storage to the mobile terminal regardless whether the wireless communication with the vehicle can be conducted.

12. The vehicle portable device according to claim 8,
wherein, when the vehicle and the vehicle portable device can conduct the wireless communication with each other while the near-field wireless communication with the mobile terminal is established:
the vehicle information acquisition part determines whether the vehicle information stored in the storage requires an update, acquires the vehicle information that requires the update from the vehicle, and updates the vehicle information stored in the storage, and
the transmission controller transmits the vehicle information acquired from the vehicle by the vehicle information acquisition part to the mobile terminal with respect to the vehicle information that requires the update, and transmits the vehicle information stored in the storage to the mobile terminal with respect to the vehicle information that does not require the update.

13. The vehicle portable device according to claim 12,
wherein the vehicle information acquisition part stops the acquisition of the vehicle information from the vehicle for a predetermined time period since the door of the vehicle is locked, and
wherein, when the near-field wireless communication with the mobile terminal is established within the predetermined time period since the door of the vehicle is locked, the transmission controller transmits the vehicle information stored in the storage to the mobile terminal regardless whether the wireless communication with the vehicle can be conducted.

14. The vehicle portable device according to claim 8,
wherein the vehicle information acquisition part stops the acquisition of the vehicle information from the vehicle for a predetermined time period since the door of the vehicle is locked, and
wherein, when the near-field wireless communication with the mobile terminal is established within the predetermined time period since the door of the vehicle is locked, the transmission controller transmits the vehicle information stored in the storage to the mobile terminal regardless whether the wireless communication with the vehicle can be conducted.

* * * * *